(12) United States Patent
Steed et al.

(10) Patent No.: US 7,103,086 B2
(45) Date of Patent: Sep. 5, 2006

(54) FREQUENCY HOPPING DATA RADIO

(75) Inventors: David Steed, American Fork, UT (US); Hugh Nielsen, Provo, UT (US)

(73) Assignee: Maxstream, Inc., Lindon, UT (US)

(*) Notice: Subject to any disclaimer, the term of this patent is extended or adjusted under 35 U.S.C. 154(b) by 819 days.

(21) Appl. No.: 09/968,294

(22) Filed: Oct. 1, 2001

(65) Prior Publication Data
US 2002/0039380 A1    Apr. 4, 2002

Related U.S. Application Data

(60) Provisional application No. 60/236,844, filed on Sep. 29, 2000.

(51) Int. Cl.
*H04B 1/707* (2006.01)

(52) U.S. Cl. .................................... 375/132

(58) Field of Classification Search ................ 375/132, 375/136
See application file for complete search history.

(56) References Cited

U.S. PATENT DOCUMENTS 5,506,862 A * 4/1996 McIntosh ................. 375/130
5,802,463 A * 9/1998 Zuckerman ............... 455/208
6,246,713 B1 * 6/2001 Mattisson .................. 375/132
6,516,039 B1 * 2/2003 Taura et al. ............... 375/354
6,597,749 B1 * 7/2003 Bracmard .................. 375/342
6,643,278 B1 * 11/2003 Panasik et al. ............ 370/330

* cited by examiner

*Primary Examiner*—Kevin Kim
(74) *Attorney, Agent, or Firm*—Angus C. Fox, III

(57) ABSTRACT

Systems and methods that utilize a received signal to provide low cost, low power, high sensitivity radio frequency hopping communication. A transmitting system prepares a data packet that is to be communicated to a receiving system. The data packet includes a header, a network identification, and transmission data. A transmission frequency is identified and a phase lock loop ("PLL") is set to the transmission frequency. The data packet is gathered, and frequency modulation and Differential Manchester encoding is performed. The signal is sent through a power amplifier and an antenna to a receiving system, which continually scans all channels of a frequency range for a valid signal. When a pulse is received, the signal is passed through a low noise amplifier, mixed down to 10.7 MHz, passed through one or more filters and one or more high gain amplifiers, mixed down to baseband, sent through a low pass filter, and then sent through a comparator. If an appropriate pulse width, expected bit pattern and a valid header are received, it is determined that the signal is valid and the entire data packet is demodulated to receive the transmitted data.

8 Claims, 6 Drawing Sheets

FREQUENCY HOPPING DATA RADIO

BACKGROUND OF THE INVENTION

1. Related Applications

This application claims priority to U.S. Provisional Patent Application Ser. No. 60/236,844, filed Sep. 29, 2000, entitled "FREQUENCY HOPPING DATA RADIO."

2. Field of the Invention

The present invention relates to radio frequency transmission systems. More particularly, the present invention relates to systems and methods that utilize a received signal to provide low cost, low power, high sensitivity, radio frequency hopping.

3. Background and Related Art

Wireless or radio frequency transmission is becoming increasingly more important in today's technology. Dispensing with the need for cables and complicated wiring, wireless technology enables networks to be connected quickly and easily. Several network-based applications may find wireless technology particularly advantageous, including supervisory control and data acquisition (SCADA), remote meter reading, home automation, instrument monitoring, point-of-sale (POS) systems, wireless local area networks (WLANs), and many other applications.

One technique for radio transmission involves frequency hopping spread spectrum technology. This technique involves changing the transmission signal to a different frequency several times a second to provide a broadband distribution. A psudo-random table is used to define the hopping sequence. The broadband distribution makes the signal transmission less likely to interfere with or to be interfered with by other signals since the transmitters only occupy a potentially used frequency for a fraction of a second. For example, because many technologies use the 900 MHz ISM band (e.g., cell phones, pagers, and cordless phones), existing 900 MHz radios are susceptible to interference and may not operate at all when close to pager or cell phone towers. Spread spectrum frequency hopping helps minimize this interference.

Frequency hopping systems, however, have their disadvantages as well. For example, the signal receiver must be able to synchronize with or track the frequency "hops" so that the receiver can properly capture and demodulate the signal. In typical frequency hopping systems, both the transmitter and the receiver have a clocking/timer mechanism to achieve this tracking. This clocking mechanism is typically quite complicated and expensive to build. Furthermore, frequency hopping systems typically use a receive signal strength indicator ("RSSI") to determine if a valid signal is present on a channel. Such indicators have the drawback that they don't reliably operate at the same sensitivity levels in which actual data receivers are capable of operating.

Radio transmission technology also involves digital modulation schemes used to modulate digital signals for radio transmission. One step in some modulation schemes entails transforming or encoding raw digital data, comprising of a series of bits in binary code, into a digital square wave signal that can be sent by a radio transmitter to a radio receiver. For example, one modulation scheme encodes raw data by transmitting a high voltage to represent a 1-bit and a low voltage for a 0-bit. The problem with this type of encoding is that when several identical bits are sent in succession the receiver cannot inherently differentiate between when one bit stops and the next bit starts. As a result, several improved encoding schemes have been developed to solve this problem.

One of the improved encoding schemes, referred to as "Manchester encoding," transmits two voltages, one high and one low, for each bit. The "normal" type of Manchester encoding transmits a high and then low voltage for a 1-bit, and a low and then high voltage for a 0-bit. Another improved encoding scheme, referred to as the "Differential Manchester encoding," indicates each bit by looking at the last half of the previous bit's signal. In particular, a Differential Manchester signal indicates a 1-bit by transmitting the first half of the signal at a voltage equal to the last half of the previous bit's signal. The first half of a 0-bit signal is transmitted at the voltage level opposite to the last half of the previous bit's signal. As with a normal Manchester signal, the Differential Manchester represents each bit by two voltages. In other words, there is a transition between signal levels in the middle of the portion of the signal that represents each bit. Thus, because each bit representation in a Manchester signal has a transition in the middle, the radio receiver is able to synchronize more easily with the radio transmitter. Therefore, the middle transition points serve as inherent "markers" that allow the radio receiver to differentiate between when one bit ends and another bit starts. Typically, a Differential Manchester signal is determined by looking for the frequency component created by the periodic transitions in the data. This frequency is used to enhance the recovery of the data by locking the recovery circuitry to the exact frequency of the transmitted data.

Thus, while several types of frequency hopping spread spectrum systems currently exist, there is nevertheless a need for frequency hopping spread spectrum technology that is inexpensive, is reliable, and maintains high sensitivity.

SUMMARY OF THE INVENTION

The present invention relates to radio frequency transmission systems. More particularly, the present invention relates to systems and methods that utilize a received signal to provide low cost, low power, high sensitivity, radio frequency hopping.

Implementation of the present invention takes place in association with a computer device or other electronic system, such as a supervisory control and data acquisition (SCADA) system, a remote meter reading system, a home automation system, an instrument monitoring system, or a point-of-sale (POS) system, which may be electronically coupled with a low power, high sensitivity, frequency hopping radio. The radio enables communication between two wireless points, where a cable, such as an RS232 cable, may have otherwise been used.

In one implementation of the present invention, a transmitting system prepares a data packet that is to be communicated to a receiving system. The data packet includes a header, a network identification, and transmission data. The network identification ensures that only the radios with the same network identification receive the signal. By having different network identifications, several networks or radios may operate in the same vicinity. The transmission data includes, for example, information read from a metering device, when the radio is used in association with a meter reading system.

At the transmitting system, a transmission frequency is identified and a phase lock loop ("PLL") is set to the transmission frequency. The data packet is gathered and frequency modulation is performed. The data is encoded using Differential Manchester encoding and the signal is sent through a power amplifier and an antenna to a receiving system.

At the receiving system all channels within a particular frequency range are continually scanned. A signal transmitted on a given channel is passed through a pre-selection filter and then through a low noise amplifier, is mixed down from a 900 MHz transmission range to 10.7 MHz, and then is passed through one or more filters and one or more high gain amplifiers. The signal is then mixed down to baseband, is sent through a low pass filter, and then is sent through a comparator to form a digital output for the microcontroller. A first channel is selected and a determination is made as to whether or not a valid pulse is received on the channel.

A valid pulse is determined by the width of the pulse. For example, a valid pulse may include one long pulse or two short pulses that may be divided by the bit rate. In order to provide a range of acceptable pulses, an error band may be added to each pulse width. If the pulse width is not valid, then the pulse is determined to be noise and another channel is selected. This process is sequentially performed from one channel to the next and continuously repeated.

If several valid pulses are received, the pulses must match a valid Differential Manchester pulse pattern. A timer with an input capture register may be used to measure consecutive pulses and to determine if they are ones or zeroes. By way of example, a valid pattern includes a series of long pulses or short pulses that are received in pairs. One short pulse followed by a long pulse, for example, would therefore be an invalid pattern, which causes the receiver to select the next channel.

Once a pulse is checked, a determination is made as to whether or not the header or a portion thereof is valid or expected. A valid header is, for example, 10 bits long. Therefore, a valid header may be found within 15 bits. If the header is not valid, the pulse is determined to be noise and another channel is selected. Alternatively, if a pulse is valid and the corresponding header is valid, the entire data packet is demodulated to receive, for example, the data read from a meter. The data packet may be demodulated using the same measurement of pulses to determine the valid bits. For example, a "1" is represented by a long pulse and a "0" is represented by two short pulses. Any errors in pulse widths or pulse patterns cause the receiver to abort data reception and to start scanning a new channel.

After a data packet is received, the same channel may be scanned for another valid header. For example, if the transmitter had more data to send and had determined it was time to select a new frequency, it may have selected to use this same channel to continue transmission. The transmitter may therefore use, for example, a short header on this new channel since it had used a long header that allowed synchronization when it first started transmitting. The receiver would find a new header on the channel and continue receiving data. Alternatively, if no data was found on this new channel or a new valid header was not found, the receiver continues scanning all channels.

While the methods and processes of the present invention have proven to be particularly useful in the area of meter reading systems, those skilled in the art can appreciate that the methods and processes can be used in a variety of different applications to provide a system that includes a low cost, low power, high sensitivity, frequency hopping radio that enables communication.

These and other features and advantages of the present invention will be set forth or will become more fully apparent in the description that follows and in the appended claims. The features and advantages may be realized and obtained by means of the instruments and combinations particularly pointed out in the appended claims. Furthermore, the features and advantages of the invention may be learned by the practice of the invention or will be obvious from the description, as set forth hereinafter.

BRIEF DESCRIPTION OF THE DRAWINGS

In order that the manner in which the above recited and other features and advantages of the present invention are obtained, a more particular description of the invention will be rendered by reference to specific embodiments thereof, which are illustrated in the appended drawings. Understanding that the drawings depict only typical embodiments of the present invention and are not, therefore, to be considered as limiting the scope of the invention, the present invention will be described and explained with additional specificity and detail through the use of the accompanying drawings in which.

DETAILED DESCRIPTION OF THE INVENTION

The present invention relates to radio frequency transmission systems. More particularly, the present invention relates to systems and methods that utilize a received signal to provide low cost, low power, high sensitivity, radio frequency hopping.

Embodiments of the present invention take place in association with an electronic system. In the disclosure and in the claims, the term "electronic system" shall refer to a computer device, computer system or other system, such as a supervisory control and data acquisition (SCADA) system, a remote meter reading system, a home automation system, an instrument monitoring system, or a point-of-sale (POS) system, that may be electronically coupled with a low power, high sensitivity, frequency hopping radio. The radio enables communication between two wireless points, where a cable, such as an RS232 cable, may have otherwise been used.

The following disclosure of the present invention is grouped into two subheadings, namely "Radio Frequency Hopping" and "Exemplary Operating Environments." The utilization of the subheadings is for convenience of the reader only and is not to be construed as limiting in any sense.

Radio Frequency Hopping

Figure 1:
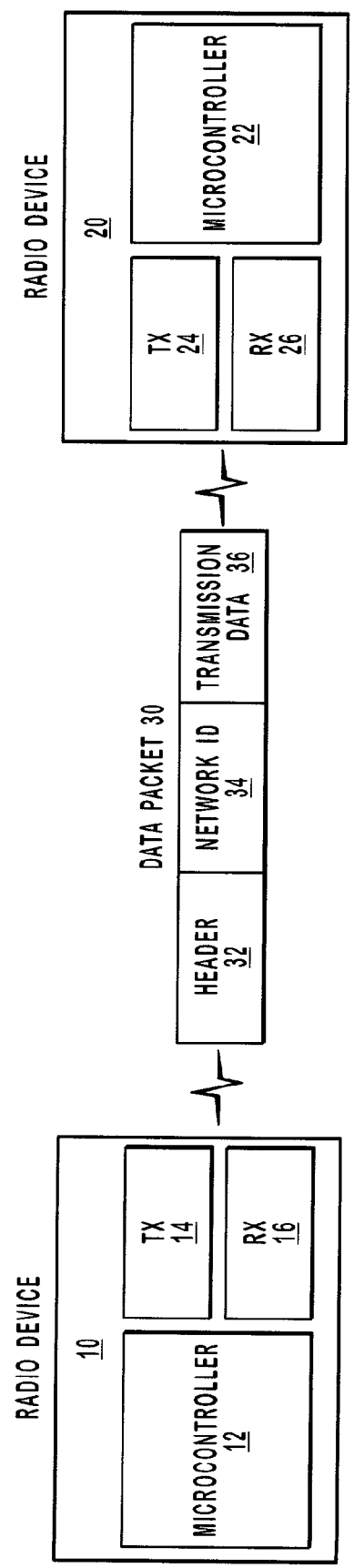
FIG. 1 illustrates a representative system that provides communication through low power, high sensitivity, radio frequency hopping in accordance with the present invention.

With reference to FIG. 1, a representative system is illustrated that provides communication through low power, high sensitivity, radio frequency hopping in accordance with the present invention. The system illustrated in FIG. 1 includes radio devices 10 and 20, each of which are configured to be electronically coupled to a system or device (not show), such as a SCADA system, a remote meter reading system, a home automation system, an instrument monitoring system, a point-of-sale (POS) system, a computer system or device, or another system that may utilize the low power, high sensitivity, radio frequency hopping communication performed between radio devices 10 and 20. Thus, in one embodiment, radio devices 10 and 20 are embedded systems that are part of one or more larger electronic systems. The embedded systems may be housed on microprocessor boards with the software programs to implement the methods and/or processes herein stored in read only memory ("ROM").

Radio devices 10 and 20 respectively include microcontrollers 12 and 22, transmitters 14 and 24, and receivers 16 and 26. Microcontrollers 12 and 22 are highly integrated chips and each typically includes a central processing unit ("CPU"), random access memory ("RAM"), and some form of ROM, input/output ports, and timers. The microcontrollers 12 and 22 are designed to oversee the processing provided herein that enables low power, high sensitivity, radio frequency hopping communication, and are examples of means for determining whether a signal received is valid, as will be explained below. Furthermore, an example of a microcontroller 12 or 22 is an Atmel 8-bit AVR® microcontroller that may be obtained from Atmel Corporation, which has its corporate offices at 2325 Orchard Parkway, San Jose, Calif., 95131.

In the illustrated embodiment, a data packet 30 is communicated from a transmitting radio device, such as radio device 10, to a receiving radio device, such as radio device 20. Data packet 30 includes a header 32, a network identification 34, and transmission data 36. In one embodiment, header 32 is ten bits long and includes a particular pattern. In one embodiment, header 32 is long enough to allow time for the receiving radio device to run through all of the channels in a frequency range to determine on which channel the signal data (data packet 30) is being transmitted. Once receiver 26 locates the proper channel, receiver 26 may receive data packets and successive header and data combinations until noise is detected. Therefore, once the radio devices 10 and 20 have been synchronized and data has been transmitted on a particular channel, the receiving radio device knows when to change channels. This changing of channels is initiated by sensing noise, as opposed to using a clocking mechanism. Moreover, the receiving device does not require adaptation in order to work with frequency hopping systems that hop at fixed time intervals of various lengths (e.g., systems that hop every 40 ms, 20 ms, 15 ms, or other time interval). The network identification ensures that only the radios with the same network identification receive the signal. By having different network identifications, several networks or radios may operate in the same vicinity. The transmission data includes, for example, information read from a metering device, when the radio is used in association with a meter reading system.

Figure 2:
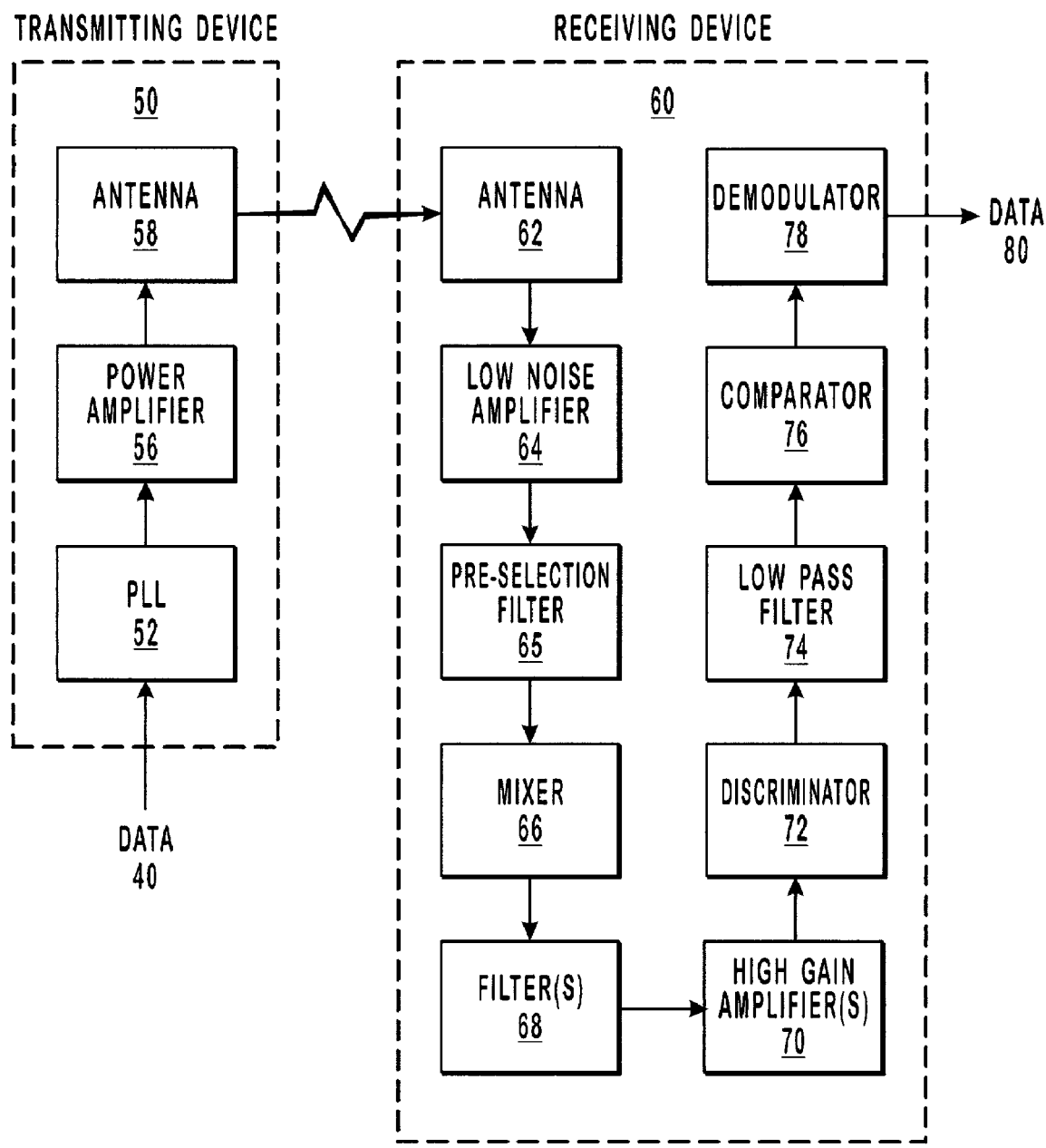
FIG. 2 illustrates a representative block diagram that provides the steps and/or components through which data may be passed through a transmitting device to a receiving device in order to communicate the data from one location to another in accordance with the present invention.

With reference to FIG. 2, a representative block diagram is illustrated that provides the steps and/or components through which data or a signal may be passed through a transmitting device to a receiving device in order to communicate the data or signal from one location to another in accordance with the present invention. In FIG. 2, a transmitting device 50, such as radio device 10 of FIG. 1, is illustrated that provides communication to a receiving device 60, such as radio device 20 of FIG. 1.

In the illustrated embodiment, data 40 is provided to a phase lock loop ("PLL") 52, where a transmission signal frequency is set. By way of example, when the embodiment is being used in a meter reading system, data 40 is information read from a meter (e.g., gas meter or electricity meter) at a residence, wherein the information read is to be transmitted to a central location. The signal passes from PLL 52 through a power amplifier 56 and an antenna 58 in order to be transmitted to receiving device 60, where it is received by antenna 62.

An example of an antenna that may be used in association with a transmitting or receiving radio device includes omni antennas, such as an Astron AXZ900 PTL omni antenna or an Astron AXH900 RP SMA R omni antenna, both of which may be obtained from Astron Antenna Company, located at 22560 Glenn Drive, Suite 114, Sterling, Va., 20164. As will be appreciated by one skilled in the art, other antennas may be used, including using a wire off of an embedded board.

Once the signal is received by antenna 62, it is passed through a low noise amplifier 64. A pre-selection filter attenuates any signals outside of the transmit frequency range and then mixer 66 mixes the signal frequency down from a 900 MHz range to 10.7 MHz. The signal is then passed through one or more filters 68, one or more high gain amplifiers 70, a discriminator 72, a low pass filter 74, a comparator 76, and then to a microprocessor or demodulator 78, which provides the resultant information, illustrated as data 80, from the microprocessor serial port, for example. Blocks 64–78 are collectively one example of means for determining whether a signal received is valid.

In one embodiment, low pass filter 74 enhances the sensitivity by approximately 10 dB. Furthermore, in one embodiment, the receiving radio device has a sensitivity of approximately −110 dbm at 10,000 bits per second and −107 dbm at 20,000 bits per second. The sensitivity of the radio device is further enhanced by the particular order of the components or steps illustrated in FIG. 2.

Figure 3:
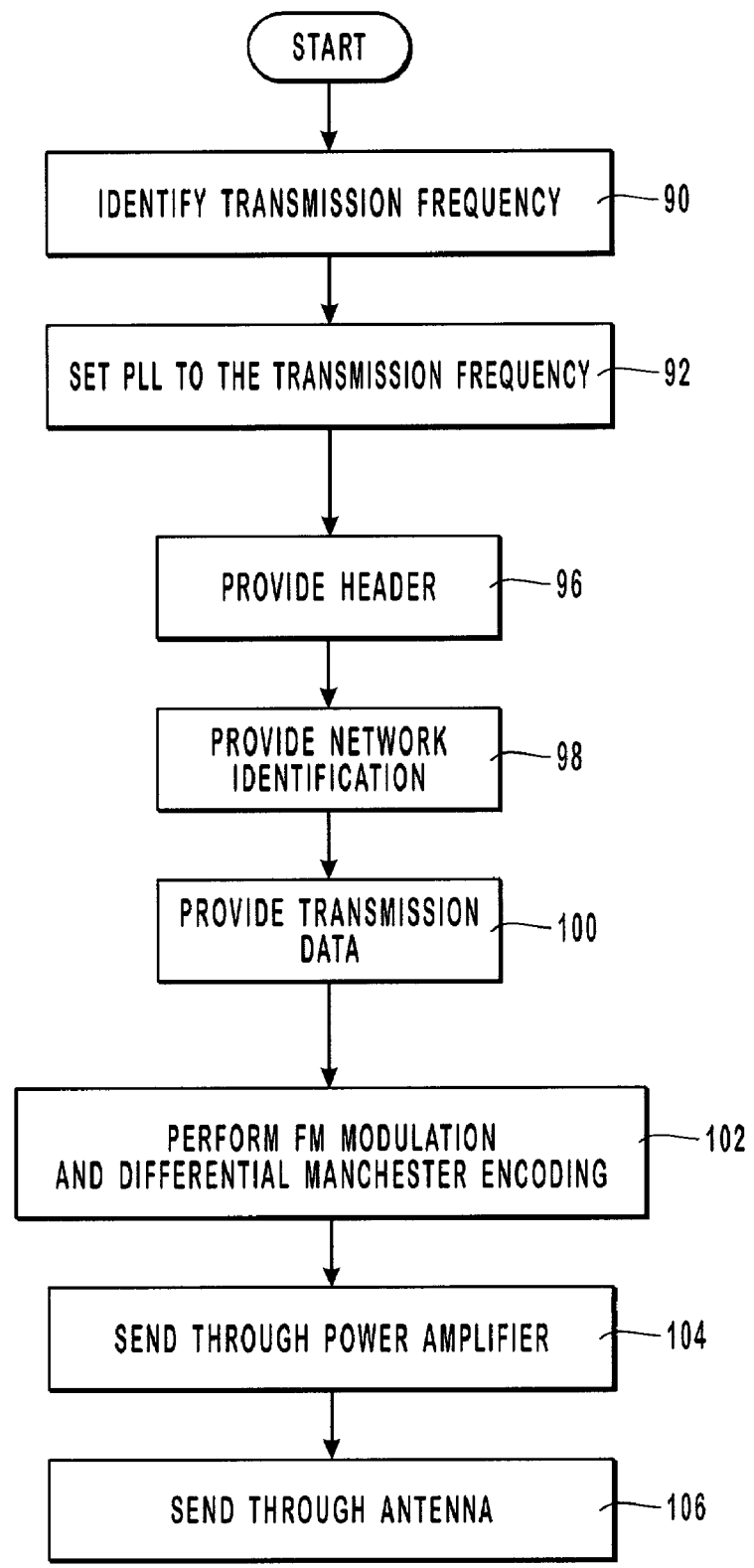
FIG. 3 provides a flow chart that illustrates a representative embodiment for preparing and transmitting data.

With reference now to FIG. 3, a representative method for preparing and transmitting a signal in accordance with the present invention is provided. In FIG. 3, execution begins at step 90, where a transmission frequency is identified. In one embodiment, the frequency is in the range of 900 MHz and may be obtained from a random table. At step 92, a phase-lock loop ("PLL") is set to the identified transmission frequency. Execution then proceeds to decision block 94 for determination as to whether or not a data packet has been gathered. Respectively at steps 96, 98 and 100 a header, network identification, and transmission data are provided to the data packet. Execution then proceeds to step 102.

At step 102, frequency modulation ("FM") and Differential Manchester encoding are performed on the data packet or signal, which is then sent through a power amplifier at step 104 and then through an antenna at step 106 in order for the signal to be transmitted to a receiving device.

Figure 4:
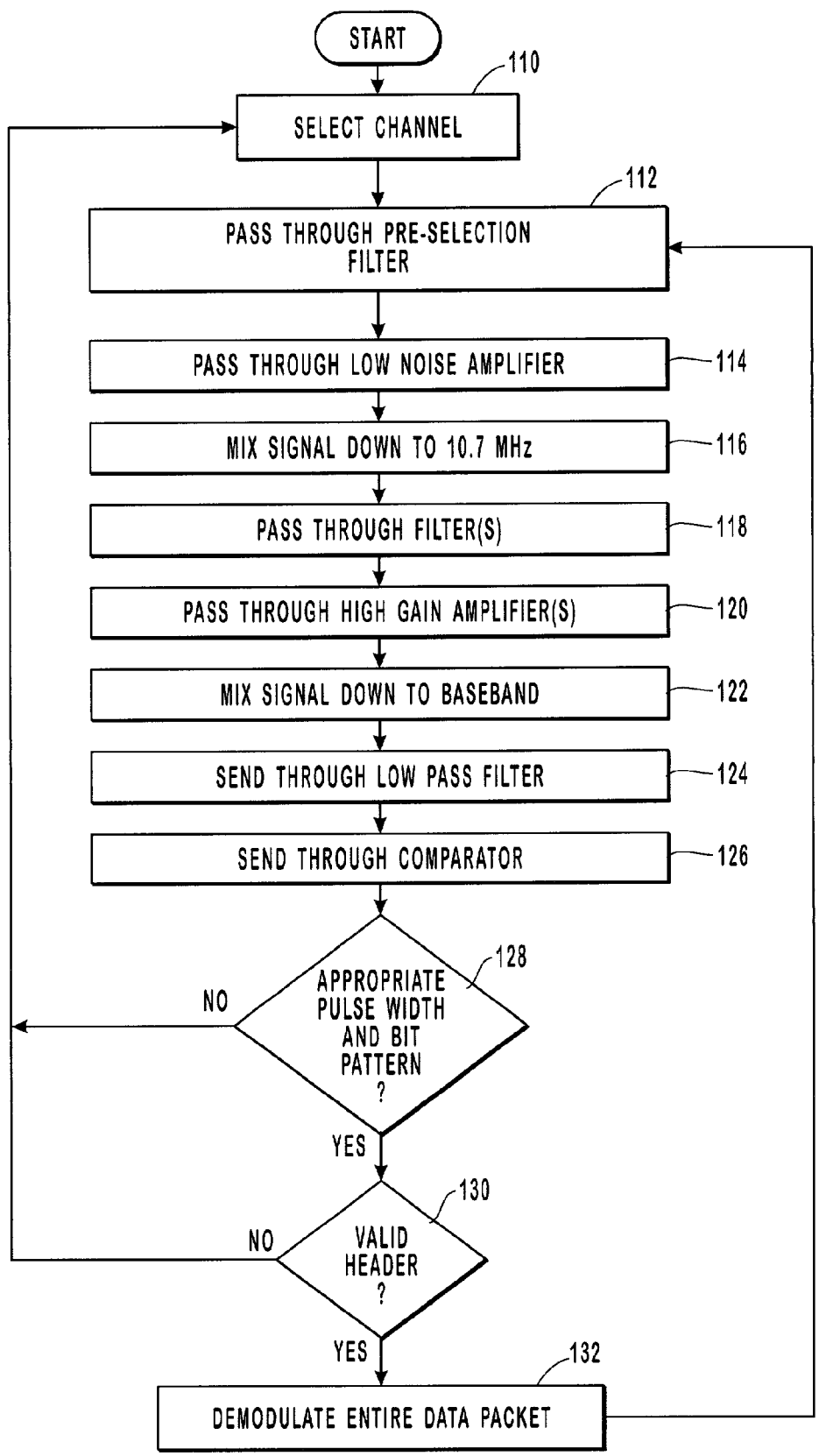
FIG. 4 provides a flow chart that illustrates a representative embodiment for continuously scanning channels, determining the validity of a pulse received on a channel, and demodulating the signal to receive the transmitted data.

With reference now to FIG. 4, a representative embodiment is provided that illustrates receiving the transmitted signal. In particular, the flow chart illustrated in FIG. 4 provides a representative embodiment for continuously scanning channels, determining the validity of a pulse received on a channel, and demodulating the signal to receive the transmitted data.

In FIG. 4, execution begins at step 110, where a channel within a particular frequency range is selected. Execution then proceeds to step 112 where a signal is passed through a pre-selection filter to attenuate any signals outside of the transmit frequency range. The signal is then passed through a low noise amplifier at step 114 and is mixed at step 116 from a transmission frequency on the order of 900 MHz down to 10.7 MHz. At step 118, the signal is passed through one or more filters and then through one or more high gain amplifiers at step 120. The signal is then mixed down to baseband at step 122, which is a Differential Manchester signal, and sent through a low pass filter at step 124. At step 126, the signal is sent through a comparator or data slicer in order to obtain the Digital Differential Manchester data, which is provided to the microcontroller of the receiving device.

A determination is then made at decision block 128 as to whether or not an appropriate, valid or expected pulse width and bit pattern was received. By way of example, in one embodiment where the signal is sent at 10,000 bits per second, an appropriate width may be approximately 100 microseconds long or 50 microseconds long, and may include a set percentage error to slightly lengthen or narrow the width. Thus, a valid pulse width may fall within a valid or expected pulse width range. An appropriate, valid or expected bit pattern is a know sequence of bits, such as a particular sequence of ten bits. If it is determined at decision block 128 that an appropriate pulse width was not received nor was an appropriate bit pattern received, the pulse is determined to have been noise, and execution returns back to step 110 for the selection of a subsequent channel. Similarly, if at decision block 128 no pulse is detected, execution returns back to step 110 for the selection of another channel.

Alternatively, if it is determined at decision block 128 that an appropriate pulse width was received, a determination is made as to whether or not a valid header was received at decision block 130. By way of example, a valid header includes the channel number that corresponds to the frequency on which the signal was transmitted.

If it is determined that a valid header was not received, the pulse received on the channel is determined to have been noise, and execution returns back to step 110 for the selection of a subsequent channel. Alternatively, if it is determined at decision block 130 that a valid header was received, execution proceeds to step 132 where the entire data packet is demodulated in order for the receiving system to obtain the transmission data of the data packet, such as, for example, the metering data information that was read. Execution then returns back to step 112. In this manner data may be received on the selected channel until noise or an invalid header is detected. The receiver will then select the next transmit frequency to scan. As such, the receiver may maintain synchronization with the transmitter as long as the transmitter continues to send data.

Thus, embodiments of the present invention embrace systems and methods for providing low cost, low power, high sensitivity radio frequency hopping. As shall be appreciated by one skilled in the art, the systems and methods of the present invention may be implemented in a variety of different.

Exemplary Operating Environments

As provided above, embodiments of the present invention take place in association with a computer device or other electronic system, such as a supervisory control and data acquisition (SCADA) system, a remote meter reading system, a home automation system, an instrument monitoring system, or a point-of-sale (POS) system, which may be electronically coupled with a low power, high sensitivity, frequency hopping radio. The radio enables communication between two wireless points, where a cable, such as an RS232 cable, may have otherwise been used.

Figure 5:
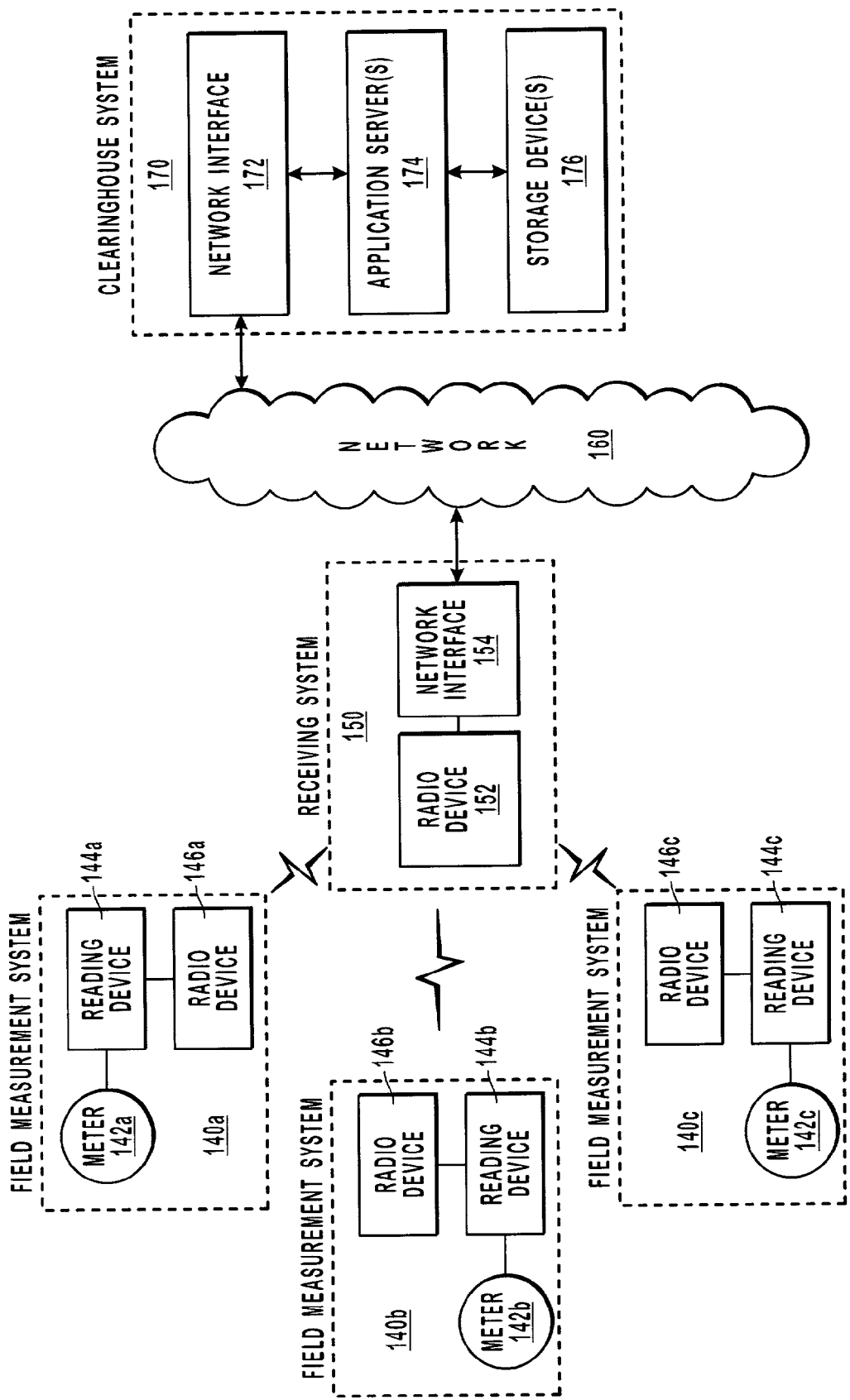
FIG. 5 provides a first representative system for implementation of the present invention.
Figure 6:
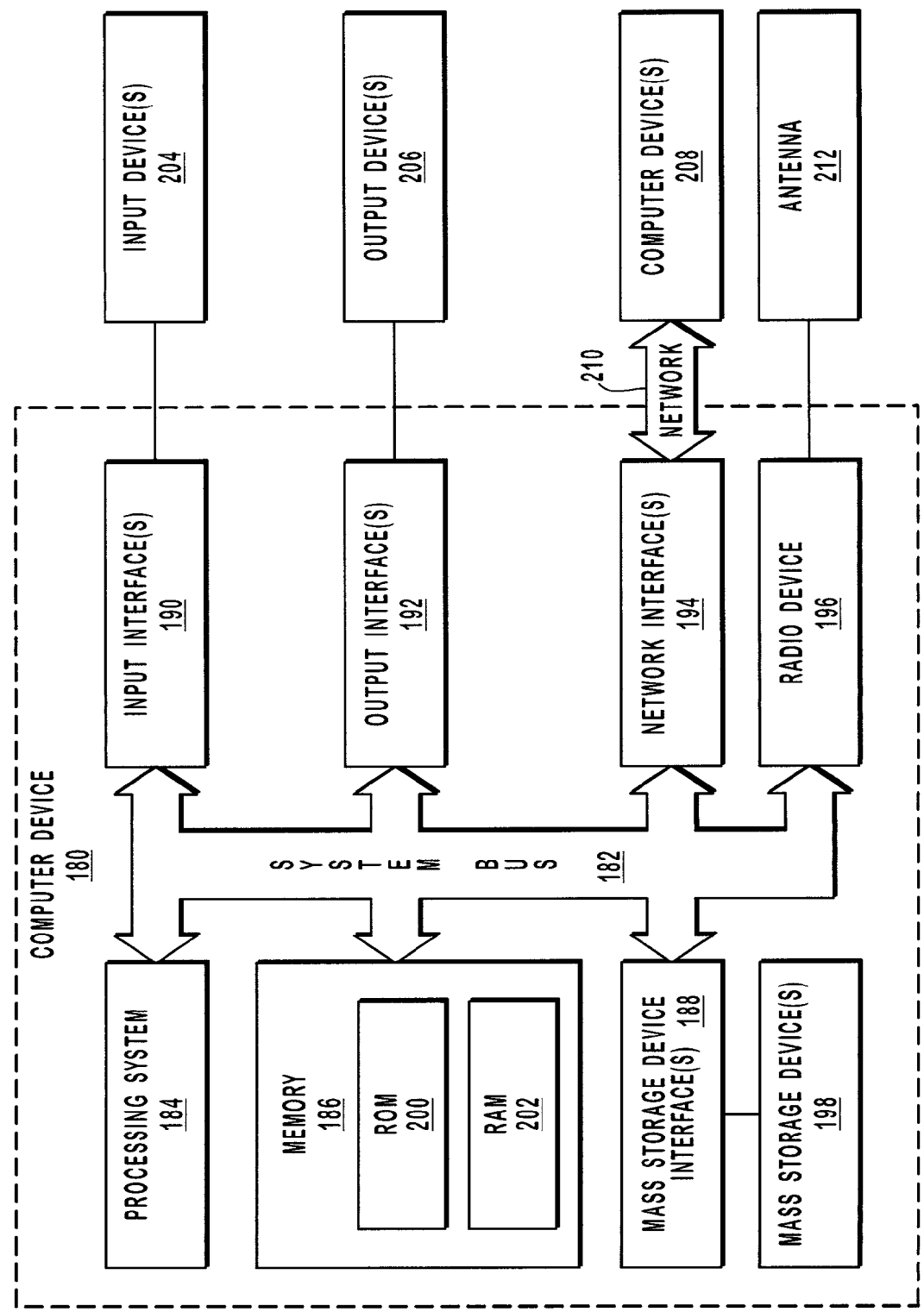
FIG. 6 provides a second representative system for implementation of the present invention.

With reference to FIGS. 5–6 examples are respectively provided of utilizing an embodiment of the present invention in association with an electronic system and with a computer device to provide a low cost, low power, high sensitivity radio frequency hopping communication. In FIG. 5, a metering system is provided that includes a variety of field measurement systems 140 that read information locally and then communicate the information to a receiving system 150, which is in turn connected to a central location or clearinghouse system 170 via a network connection 160.

Each of the field measurement systems 140 include a meter 142, a reading device 144, and a radio device 146. Meters 142 may be, for example, a gas or electricity meter. Meters 142 are periodically read by corresponding reading devices 144, which send the data read to the corresponding radio devices 146. Each of the radio devices transmit information to receiving system 150 on a unique frequency channel. Thus, radio device 152 continually searches through the frequency channels to receive the transmission as disclosed herein.

Receiving system 150 may, for example, be located on a telephone pole and is configured to receive all of the meter readings in a given neighborhood. Receiving system 150 includes a network interface 154, which enables the received transmissions to be sent to a clearinghouse system 170 across a network, which may include a LAN or a WAN. In one embodiment, network 160 is a network of telephone lines that provide a transmission medium. The information is received through network interface 172 and may be processed by one or more application servers 174 and stored on a storage device 176.

While the methods and processes of the present invention have proven to be particularly useful in the area of meter reading systems, those skilled in the art can appreciate that the methods and processes can be used in a variety of different applications to provide a system that includes a low cost, low power, high sensitivity, frequency hopping radio that enables communication. One such application is illustrated in FIG. 6, which provides a computer device 180 having a radio device connected therewith.

Embodiments of the present invention embrace one or more computer readable media, wherein each medium may be configured to include or includes thereon data or computer executable instructions for manipulating data. The computer executable instructions include data structures, objects, programs, routines, or other program modules that may be accessed by a processing system, such as one associated with a general-purpose computer capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system.

With reference to FIG. 6, a representative system for implementing the invention includes computer device 180, which may be a general-purpose or special-purpose computer. For example, computer device 180 may be a personal computer, a notebook computer, a personal digital assistant ("PDA") or other hand-held device, a workstation, a minicomputer, a mainframe, a supercomputer, a multi-processor system, a network computer, a processor-based consumer electronic device, or the like.

Computer device 180 includes system bus 182, which may be configured to connect various components thereof, including radio device 196, and enables data to be exchanged between two or more components. System bus 182 may include one of a variety of bus structures including a memory bus or memory controller, a peripheral bus, or a local bus that uses any of a variety of bus architectures. Typical components connected by system bus 182 include processing system 184 and memory 186. Other components may include one or more mass storage device interfaces 188, input interfaces 190, output interfaces 192, and/or network interfaces 194, each of which will be discussed below.

Processing system 184 includes one or more processors, such as a central processor and optionally one or more other processors designed to perform a particular function or task. It is typically processing system 184 that executes the instructions provided on computer readable media, such as on memory 186, a magnetic hard disk, a removable magnetic disk, a magnetic cassette, an optical disk, or from a communication connection, which may also be viewed as a computer readable medium.

Memory 186 includes one or more computer readable media that may be configured to include or includes thereon data or instructions for manipulating data, and may be accessed by processing system 184 through system bus 182. Memory 186 may include, for example, ROM 200, used to permanently store information, and/or RAM 202, used to temporarily store information. ROM 200 may include a basic input/output system ("BIOS") having one or more routines that are used to establish communication, such as during start-up of computer device 180. RAM 202 may include one or more program modules, such as one or more operating systems, application programs, and/or program data.

One or more mass storage device interfaces 188 may be used to connect one or more mass storage devices 198 to system bus 182. The mass storage devices 188 may be incorporated into or may be peripheral to computer device 180 and allow computer device 180 to retain large amounts of data. Optionally, one or more of the mass storage devices 198 may be removable from computer device 180. Examples of mass storage devices include hard disk drives, magnetic disk drives, tape drives and optical disk drives. A mass storage device 198 may read from and/or write to a magnetic hard disk, a removable magnetic disk, a magnetic cassette, an optical disk, or another computer readable medium. Mass storage devices 198 and their corresponding computer readable media provide nonvolatile storage of data and/or executable instructions that may include one or more program modules such as an operating system, one or more application programs, other program modules, or program data. Such executable instructions are examples of program code means for implementing steps for methods disclosed herein.

One or more input interfaces 190 may be employed to enable a user to enter data and/or instructions to computer device 180 through one or more corresponding input devices 204. Examples of such input devices include a keyboard and alternate input devices, such as a mouse, trackball, light pen, stylus, or other pointing device, a microphone, a joystick, a game pad, a satellite dish, a scanner, a camcorder, a digital camera, and the like. Similarly, examples of input interfaces 190 that may be used to connect the input devices 204 to the system bus 182 include a serial port, a parallel port, a game port, a universal serial bus ("USB"), a firewire (IEEE 1394), or another interface.

One or more output interfaces 192 may be employed to connect one or more corresponding output devices 206 to system bus 182. Examples of output devices include a monitor or display screen, a speaker, a printer, and the like. A particular output device 206 may be integrated with or peripheral to computer device 180. Examples of output interfaces include a video adapter, an audio adapter, a parallel port, and the like.

One or more network interfaces 210 enable computer device 10 to exchange information with one or more other local or remote computer devices, illustrated as computer devices 208, via a network 210 that may include hardwired and/or wireless links. Examples of network interfaces include a network adapter for connection to a local area network ("LAN") or a modem, wireless link, or other adapter for connection to a wide area network ("WAN"), such as the Internet. The network interface 194 may be incorporated with or peripheral to computer device 180. In a networked system, accessible program modules or portions thereof may be stored in a remote memory storage device. Furthermore, in a networked system computer device 180 may participate in a distributed computing environment, where functions or tasks are performed by a plurality of networked computer devices.

Radio device includes an internal or external antenna 212 to transmit and/or receive information in accordance with the methods and processes disclosed herein. Furthermore, when radio device 196 is integrated with computer device 180, information may be communicated through a low cost, low power, high sensitivity radio frequency hopping communication system and then processed or otherwise transmitted in a computer system configuration. Similarly, information may be sent via a computer system configuration and then subsequently sent through the a low cost, low power, high sensitivity radio frequency hopping communication system in accordance with the methods and/or systems disclosed herein.

Thus, as discussed herein, the embodiments of the present invention embrace systems and methods for providing low cost, low power, high sensitivity radio frequency hopping. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. In a frequency hopping radio communication system, a method of transmitting and receiving data, said method comprising the steps of:

at a transmission location,
preparing at least one data packet, each data packet being encoded using Manchester Differential encoding, each data packet having a header containing a repeating pulse pattern appended to transmission data; and
selecting one of a plurality of channels within a frequency range for each data packet;
transmitting each data packet as a frequency-modulated signal on its selected channel; and
at a receiving location,
scanning all channels within said frequency range and at least partially demodulating any received signal and passing the demodulated signal through a low-pass filter and a comparator in order to both determine on which of said channels a particular data packet is being transmitted, and validate at least one pulse pattern by ascertaining that each pulse of the pattern has a width within an acceptable range before the transmission data within that data packet is received.

2. The method of transmitting and receiving data of claim 1, wherein said header has a length that is no greater than that which is sufficient to enable scanning of all channels within said frequency range, identify an incoming data packet on one of said channels, validate at least one pulse pattern within the header before the transmission data within that data packet is received.

3. The method of transmitting and receiving data of claim 1, wherein only data packets having headers with valid pulse widths, an expected bit pattern, and a particular data content are fully demodulated.

4. A frequency hopping data radio system comprising:
a transmitting system that
prepares a data packet, which includes a header containing a repeating pulse pattern, a network identification, and transmission data;
selects a transmission frequency corresponding to one of a plurality of channels within a frequency range;
subjects the data packet to Differential Manchester encoding; and
transmits the encoded data packet as a frequency-modulated signal on the selected transmission frequency; and
a receiving system that
scans all channels within said frequency range and at least partially demodulates any received signal in order to determine if a received signal is an expected data packet;
validates at least one pulse pattern of a received data packet by ascertaining that each pulse of said at least one pulse pattern has a width within an acceptable range before the transmission data within that packet is received.

5. The frequency hopping data radio system of claim 4, wherein demodulated signals are passed through a low-pass filter prior to validation and decoding of received transmission data.

6. The frequency hopping data radio system of claim 4, wherein said header is of sufficient length to enable said radio receiver to scan all channels within said frequency range in order to both determine on which of said channels a particular data packet is being transmitted, and to validate at least one pulse before the transmission data within that data packet is received.

7. The frequency hopping data radio system of claim 6, wherein said header has a length that is no greater than that which is sufficient to enable said radio receiver to scan all channels within said frequency range in order to both determine on which of said channels a particular data packet is being transmitted, and to validate at least one pulse pattern before the transmission data within that data packet is received.

8. The method of transmitting and receiving data of claim 4, wherein only data packets having headers with validated pulse patterns, an expected bit pattern, and a particular data content are fully demodulated.

* * * * *